United States Patent
Sanaullah et al.

(10) Patent No.: US 9,167,204 B2
(45) Date of Patent: Oct. 20, 2015

(54) SYSTEMS AND METHODS FOR MANAGING TELECONFERENCE PARTICIPANT MUTE STATE

(71) Applicant: Dell Products L.P., Round Rock, TX (US)

(72) Inventors: Abu Shaher Sanaullah, Austin, TX (US); Richard W. Schuckle, Austin, TX (US); Roman Joel Pacheco, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/721,735

(22) Filed: May 26, 2015

(65) Prior Publication Data

US 2015/0264316 A1    Sep. 17, 2015

Related U.S. Application Data (62) Division of application No. 14/036,766, filed on Sep. 25, 2013, now Pat. No. 9,071,692.

(51) Int. Cl.
*H04M 3/42* (2006.01)
*H04N 7/15* (2006.01)

(52) U.S. Cl.
CPC .................................... *H04N 7/15* (2013.01)

(58) Field of Classification Search
CPC combination set(s) only.
See application file for complete search history.

(56) References Cited

U.S. PATENT DOCUMENTS

| | | |
|---|---|---|
| 2009/0319898 A1 | 12/2009 | Vitorino et al. |
| 2010/0067680 A1 | 3/2010 | Hanson et al. |
| 2011/0117886 A1 | 5/2011 | Travis et al. |
| 2013/0051543 A1 | 2/2013 | McDysan et al. |
| 2013/0321156 A1 | 12/2013 | Liu |

*Primary Examiner* — Joseph J Nguyen
(74) *Attorney, Agent, or Firm* — Jackson Walker L.L.P.

(57) ABSTRACT

In accordance with embodiments of the present disclosure, a method for managing a mute state of a participant in a teleconference may include detecting, based on analysis of at least one characteristic of audio data received from a microphone associated with the participant or image data received from a camera associated with the participant, whether the participant is attempting to speak to other teleconference participants. The method may also include providing an alert to the participant in response to a detecting that the participant is attempting to speak to other conference participants while the microphone is muted.

12 Claims, 3 Drawing Sheets

SYSTEMS AND METHODS FOR MANAGING TELECONFERENCE PARTICIPANT MUTE STATE

The present patent application is a division of a previously filed U.S. patent application Ser. No. 14/036,766, filed Sep. 25, 2013, the entirety of which is hereby incorporated by reference.

TECHNICAL FIELD

The present disclosure relates in general to information handling systems, and more particularly, to managing a mute state of a teleconference participant interfacing with an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Various types of information handling systems may be utilized to conduct teleconferences among a plurality of participants. During a teleconference, a participant may from time to time desire to mute sounds (e.g., ambient noise, private conversations with persons other than teleconference participants, etc.) incident upon a microphone of such participant's information handling system, to prevent such sounds from being transmitted to other teleconference participants, particularly when the participant is not actively intending to speak to teleconference participants.

In traditional approaches, a participant must typically manually manage the mute state of his or her microphone to avoid having the microphone in the wrong mode (e.g., unmuted when the microphone should be muted, and vice versa). Oftentimes, a participant will place the microphone in one mode, and forget which mode the microphone is in, producing unintended results.

For example, a participant may mute a microphone in a teleconference when he or she is not the active participant for a bulk of the teleconference. However, if such participant is suddenly required to speak, he or she may begin speaking while forgetting to unmute the microphone. Accordingly, a participant may speak for many seconds while muted before becoming aware or being reminded from other participants that he or she is muted. As another example, a user may forget that a microphone is unmuted, and undesired audio (e.g., excessive background noise, private conversations, etc.) may be transmitted to other participants.

SUMMARY

In accordance with the teachings of the present disclosure, one or more disadvantages and problems associated with managing a mute state of a teleconference participant may be reduced or eliminated.

In accordance with embodiments of the present disclosure, a method for managing a mute state of a participant in a teleconference may include detecting, based on analysis of at least one characteristic of audio data received from a microphone associated with the participant or image data received from a camera associated with the participant, whether the participant is attempting to speak to other teleconference participants. The method may also include providing an alert to the participant in response to a detecting that the participant is attempting to speak to other conference participants while the microphone is muted.

In accordance with these and other embodiments of the present disclosure, a method for managing a mute state of a participant in a teleconference may include detecting, based on analysis of at least one characteristic of audio data received from a microphone associated with the participant or image data received from a camera associated with the participant, whether the participant is attempting to speak to other teleconference participants. The method may also include modifying the audio data to prevent transmission of audio to other teleconference participants in response to a detecting that the participant is not attempting to speak to other conference participants while the microphone is unmuted.

In accordance with these and other embodiments of the present disclosure, an article of manufacture may include a non-transitory computer readable medium and computer-executable instructions carried on the non-transitory computer readable medium, the instructions readable by a processor. The instructions, when read and executed, may cause the processor to (i) detect, based on analysis of at least one characteristic of audio data received from a microphone associated with a participant or image data received from a camera associated with the participant, whether the participant is attempting to speak to other teleconference participants; and (ii) provide an alert to the participant in response to a detecting that the participant is attempting to speak to other conference participants while the microphone is muted.

In accordance with these and other embodiments of the present disclosure, an article of manufacture may include a non-transitory computer readable medium and computer-executable instructions carried on the non-transitory computer readable medium, the instructions readable by a processor. The instructions, when read and executed, may cause the processor to (i) detect, based on analysis of at least one characteristic of audio data received from a microphone associated with a participant or image data received from a camera associated with the participant, whether the participant is attempting to speak to other teleconference participants; and (ii) modify the audio data to prevent transmission of audio to other teleconference participants in response to a detecting that the participant is not attempting to speak to other conference participants while the microphone is unmuted.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
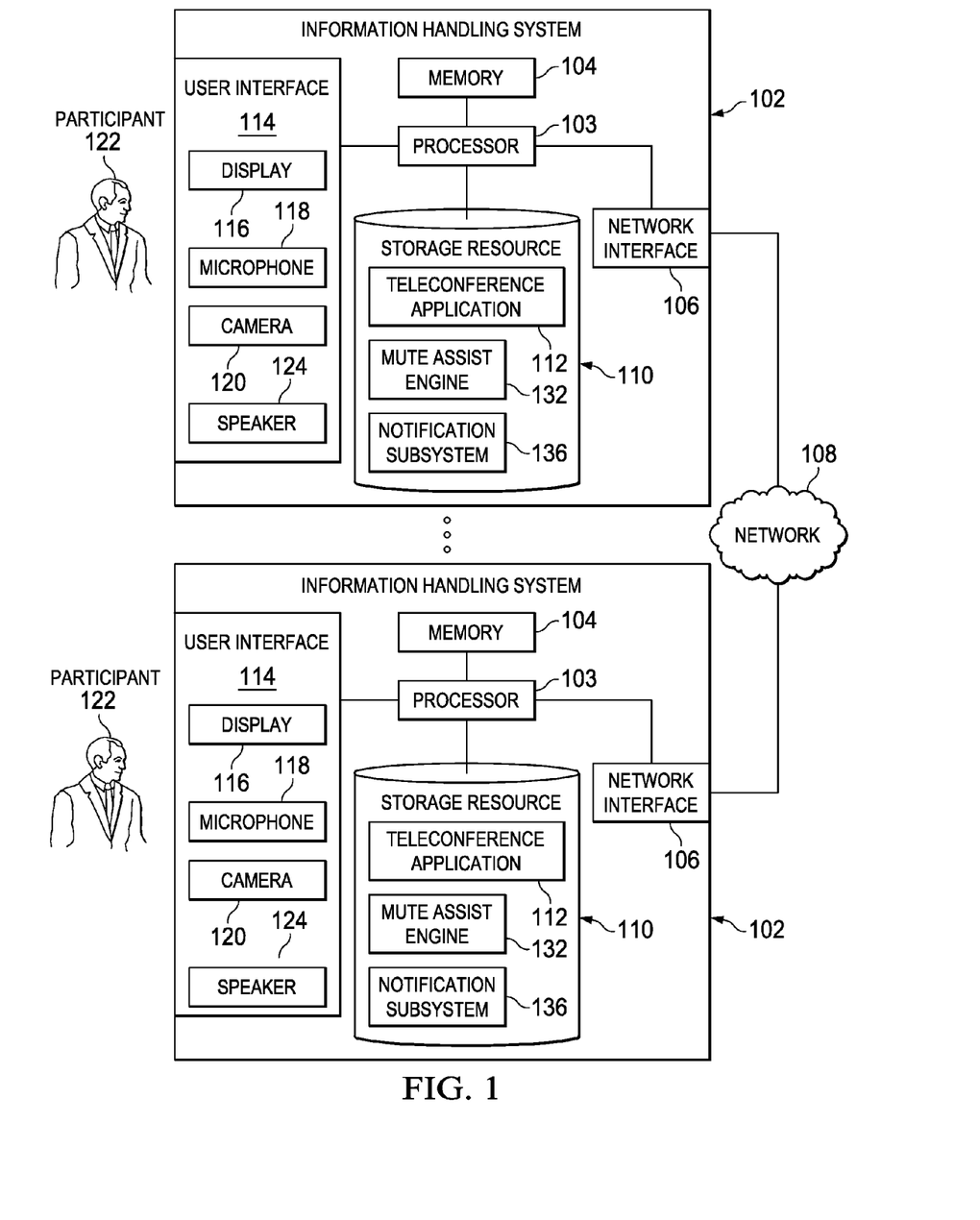
FIG. 1 illustrates a block diagram of an example teleconferencing system, in accordance with embodiments of the present disclosure.
Figure 2:
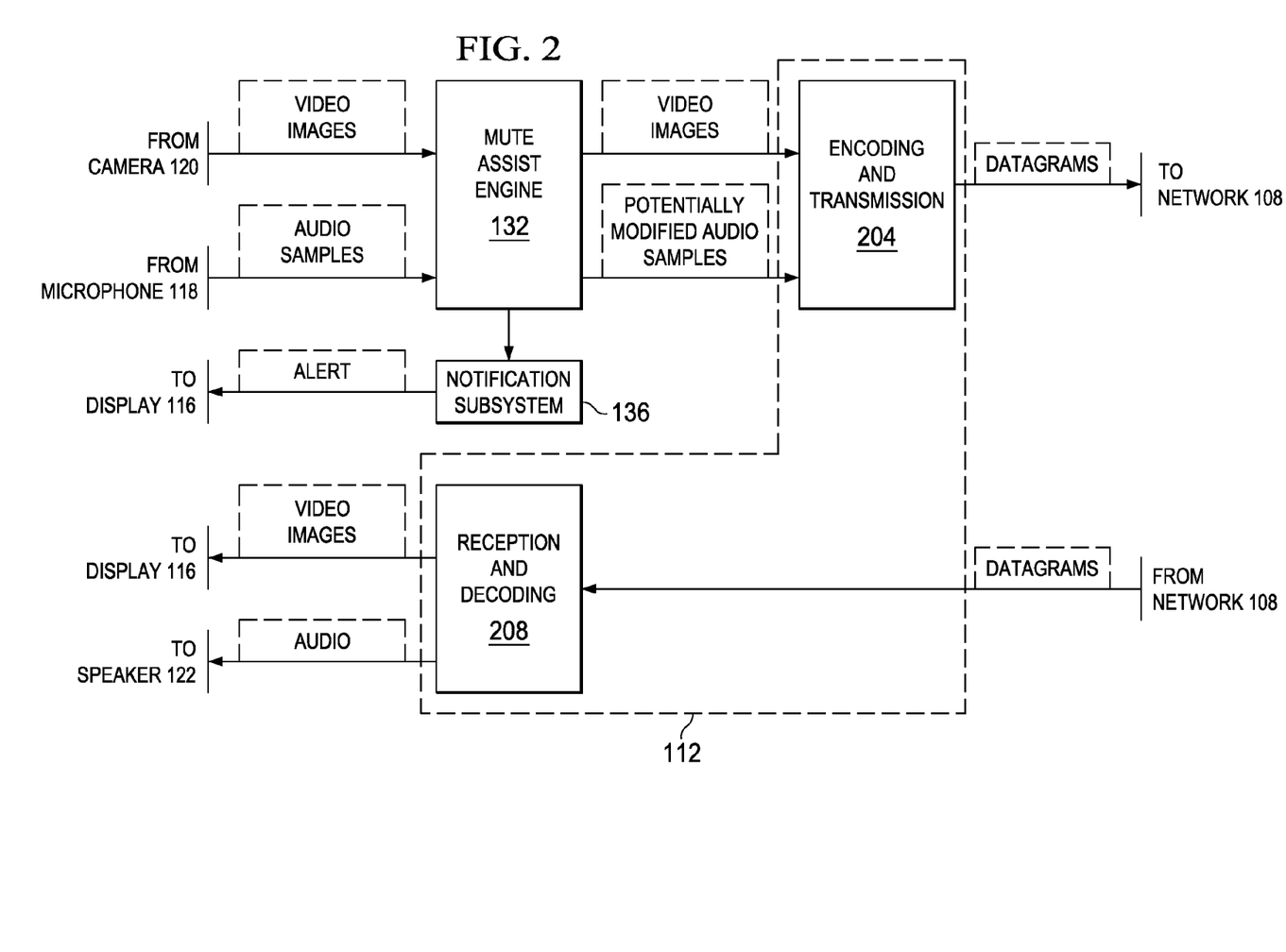
FIG. 2 illustrates a functional block diagram a mute assist engine, a notification subsystem, and functional elements of a teleconference application, in accordance with embodiments of the present disclosure.
Figure 3:
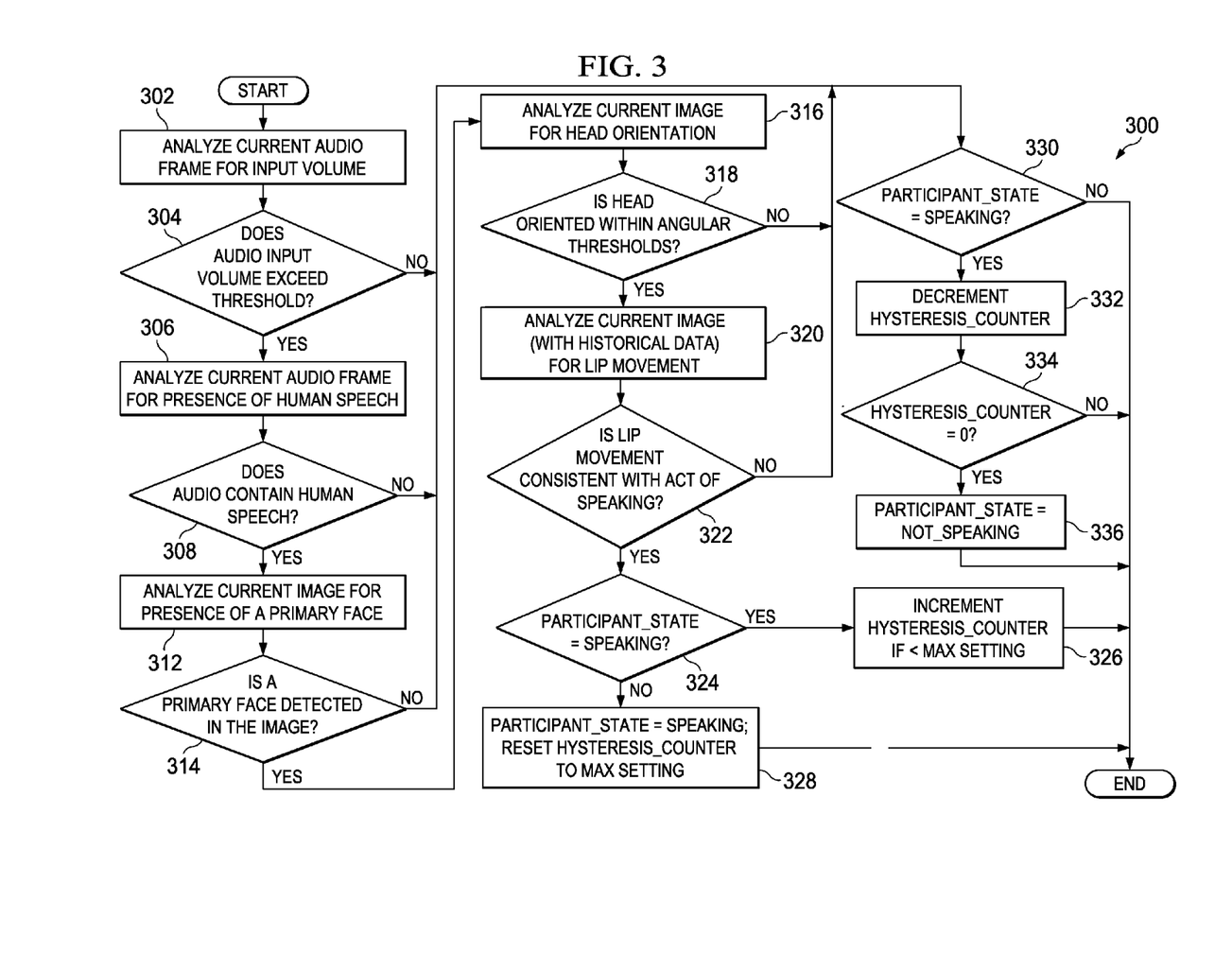
FIG. 3 illustrates a flow chart of an example method for determining whether a teleconference participant is speaking, in accordance with embodiments of the present disclosure.

Preferred embodiments and their advantages are best understood by reference to FIGS. 1-3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

An information handling system may include or may be coupled via a network to one or more arrays of storage resources. The array of storage resources may include a plurality of storage resources, and may be operable to perform one or more input and/or output storage operations, and/or may be structured to provide redundancy. In operation, one or more storage resources disposed in an array of storage resources may appear to an operating system as a single logical storage unit or "logical unit."

In certain embodiments, an array of storage resources may be implemented as a Redundant Array of Independent Disks (also referred to as a Redundant Array of Inexpensive Disks or a RAID). RAID implementations may employ a number of techniques to provide for redundancy, including striping, mirroring, and/or parity checking. As known in the art, RAIDs may be implemented according to numerous RAID standards, including without limitation, RAID 0, RAID 1, RAID 0+1, RAID 3, RAID 4, RAID 5, RAID 6, RAID 01, RAID 03, RAID 10, RAID 30, RAID 50, RAID 51, RAID 53, RAID 60, RAID 100, etc.

FIG. 1 illustrates a block diagram of an example teleconferencing system 100, in accordance with embodiments of the present disclosure. As depicted in FIG. 1, teleconferencing system 100 may include one or more information handling systems 102 and a network 108.

Each information handling system 102 may generally be configured to communicate via network 108 with one or more other information handling systems 102. In certain embodiments, one or more of information handling systems 102 may be a personal computer (e.g., a desktop computer or a portable computer). In these and other embodiments, one or more of information handling systems 102 may be a mobile device (e.g., smart phone, a tablet computing device, a handheld computing device, a personal digital assistant, or any other device that may be readily transported on a person of a user of such mobile device). In these and other embodiments, one or more of information handling systems 102 may be a Voice over Internet Protocol (VoIP) phone (e.g., a purpose-built hardware device that appears much like an ordinary landline telephone).

As depicted in FIG. 1, each information handling system 102 may include a processor 103, a memory 104 communicatively coupled to processor 103, a network interface 106 communicatively coupled to processor 103, a storage resource 110 communicatively coupled to processor 103, and a user interface 114 communicatively coupled to processor 103.

Each processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in its associated memory 104, associated storage resource 110, and/or another component of information handling system 102.

Each memory 104 may be communicatively coupled to its associated processor 103 and may include any system, device, or apparatus configured to retain program instructions and/or data for a period of time (e.g., computer-readable media). Each memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its associated information handling system 102 is turned off.

Each network interface 106 may include any suitable system, apparatus, or device operable to serve as an interface between its associated information handling system 102 and network 108. Each network interface 106 may enable its associated information handling system 102 to communicate over network 108 using any suitable transmission protocol and/or standard, including without limitation all transmission protocols and/or standards enumerated below with respect to the discussion of network 108.

Each storage resource 110 may include a system, device, or apparatus configured to store data. A storage resource 110 may include one or more hard disk drives, magnetic tape libraries, optical disk drives, magneto-optical disk drives, solid state storage drives, compact disk drives, compact disk arrays, disk array controllers, and/or any other systems, apparatuses or devices configured to store data. In certain embodiments, storage resource 110 may include one or more storage enclosures configured to hold and/or power one or more of such devices. In the embodiments represented by FIG. 1, storage resource 110 may reside within its associated information handling system 102. However, in other embodiments, storage resource 110 may reside external to its associated information handling system 102 (e.g., may be coupled to its associated information handling system 102 via network 108).

As shown in FIG. 1, a storage resource 110 may have stored thereon a teleconferencing application 112, a mute assist engine 132, and/or a notification subsystem 136.

Teleconferencing application 112 may comprise a program of instructions which a processor 103 may read and execute to manage participation of a participant 122 in a teleconference with one or more other participants 122, as described in greater detail elsewhere in this disclosure.

Mute assist engine 132 may comprise a program of instructions that may retrieve video image data from camera 120 and audio sample data from microphone 118, analyze such video image data and audio sample data, and based on such analysis, modify the audio sample data as needed to generate potentially-modified audio samples, in order to prevent undesired audio from being encoded and transmitted to other teleconference participants 122. In addition, mute assist engine 132 may communicate one or more indications to notification subsystem 136 (described below) which may in turn communicate an alert to a participant 122 regarding his or her mute status. Functionality of mute assist engine 132 is discussed in greater detail elsewhere in this disclosure, including, without limitation, FIGS. 2 and 3 and the descriptions thereof below. In some embodiments, mute assist engine 132 may be part of an operating system executed on an information handling system 102 (e.g., a driver or application service). Although FIG. 1 depicts mute assist engine 132 as separate from teleconference application 112, in some embodiments, mute assist engine 132 may be part of teleconference application 112.

Notification subsystem 136 may comprise a program of instructions that may receive one or more indications from mute assist engine 132, and based thereon, communicate one or more alerts to a participant 122 via display 116. For example, whenever a microphone 118 is muted by a participant but mute assist engine 132 determines that participant 122 is attempting to speak to other conference participants, mute assist engine 132 may send an indication to notification subsystem 136 of the participant 122's attempt to speak to other conference participants 122 while muted, and notification subsystem 136 may communicate an alphanumeric and/or graphical alert via display 116 to participant 122 in accordance with the indication. In these and alternative embodiments, such alert may also be in the form of an audible alert communicated to speaker 124. In these and other embodiments, notification subsystem 136 may provide such alert in a manner other than those explicitly shown as being part of user interface 114 (e.g., via a haptic output of user interface 114). In some embodiments, notification subsystem 136 may be part of an operating system executed on an information handling system 102 (e.g., a driver or application service). Although FIG. 1 depicts notification subsystem 136 as separate from teleconference application 112, in some embodiments, notification subsystem 136 may be part of teleconference application 112.

Although teleconferencing application 112, mute assist engine 132, and notification subsystem 136 are depicted in FIG. 1 as being locally stored to a storage resource 110 of an information handling system 102, in some embodiments, one or more of teleconferencing application 112, mute assist engine 132, and notification subsystem 136 may be stored externally or remotely from an information handling system 102 and accessible to such information handling system 102 via network 108, and loaded by processor 103 via network 108 (e.g., one or more of such applications may be a streaming application).

User interface 114 may comprise any instrumentality or aggregation of instrumentalities by which a participant 122 may interact with information handling system 102. For example, user interface 114 may permit a user to input data and/or instructions into information handling system 102 (e.g., via a keypad, keyboard, touch screen, microphone, camera, and/or other data input device), and/or otherwise manipulate information handling system 102 and its associated components. User interface 114 may also permit information handling system 102 to communicate data to a participant 122 (e.g., via a display device, speaker, and/or other data output device). As shown in FIG. 1, user interface 114 may include one or more of a display 116, microphone 118, camera 120, and speaker 124.

A display 116 may comprise any suitable system, device, or apparatus configured to display human-perceptible graphical data and/or alphanumeric data to a participant 122. For example, in some embodiments, display 116 may comprise a liquid crystal display.

A microphone 118 may comprise any system, device, or apparatus configured to convert sound incident at microphone 118 to an electrical signal that may be processed by processor 103. In some embodiments, microphone 118 may include a capacitive microphone (e.g., an electrostatic microphone, a condenser microphone, an electret microphone, a microelectromechanical systems (MEMs) microphone, etc.) wherein such sound is converted to an electrical signal using a diaphragm or membrane having an electrical capacitance that varies as based on sonic vibrations received at the diaphragm or membrane.

A camera 120 may comprise any system, device, or apparatus configured to record images (moving or still) into one or more electrical signals that may be processed by processor 103.

A speaker 124 may comprise any system, device, or apparatus configured to produce sound in response to electrical audio signal input. In some embodiments, a speaker 124 may comprise a dynamic loudspeaker, which employs a lightweight diaphragm mechanically coupled to a rigid frame via a flexible suspension that constrains a voice coil to move axially through a cylindrical magnetic gap such that when an electrical signal is applied to the voice coil, a magnetic field is created by the electric current in the voice coil, making it a variable electromagnet. The coil and the driver's magnetic system interact, generating a mechanical force that causes the coil (and thus, the attached cone) to move back and forth, thereby reproducing sound under the control of the applied electrical signal coming from the amplifier.

In addition to processor 103, memory 104, network interface 106, storage resource 110, and user interface 114, information handling system 102 may include one or more other information handling resources. Such an information handling resource may include any component system, device or apparatus of an information handling system, including without limitation, a processor, bus, memory, I/O device and/or interface, storage resource (e.g., hard disk drives), network interface, electro-mechanical device (e.g., fan), display, power supply, and/or any portion thereof. An information handling resource may comprise any suitable package or form factor, including without limitation an integrated circuit package or a printed circuit board having mounted thereon one or more integrated circuits.

Network 108 may be a network and/or fabric configured to couple information handling systems 102 to one another. Network 108 may include a communication infrastructure, which provides physical connections, and a management layer, which organizes the physical connections, and information handling systems 102. Network 108 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet, or any other appropriate architecture or system that facilitates the communication of signals, data, and/or messages (generally referred to as data). Network 108 may transmit data using any storage and/or communication protocol, including without limitation, Fibre Channel, Frame Relay, Asynchronous Transfer Mode (ATM), Internet protocol (IP), other packet-based protocol, small computer system interface (SCSI), advanced technology attachment (ATA), serial ATA (SATA), advanced technology attachment packet interface (ATAPI), serial storage architecture (SSA), integrated drive electronics (IDE), and/or any combination thereof. Network 108 and its various components may be implemented using hardware, firmware, software, or any combination thereof.

FIG. 2 illustrates a functional block diagram of mute assist engine 132, notification subsystem 136, and functional elements of a teleconference application 112, in accordance with embodiments of the present disclosure. As shown in FIG. 2, teleconference application 112 may include encoding and transmission block 204 and reception and decoding 208.

Encoding and transmission block 204 may comprise a program of instructions that may receive video image data (either from mute assist engine 132 or directly from camera 120) and potentially-modified audio sample data from mute assist engine 132, encode such data into datagrams (e.g., packets or frames) formatted for communication via network 108, and transmit such datagrams via network 108 to one or more other information handling systems 102.

Reception and decoding block 208 may receive datagrams, including encoded video image data and audio sample data, from network 108 and transmitted from one or more remote information handling systems 102, and decode such datagrams into data suitable for communication to display 116 and/or speaker 124, so that a participant 122 may see and/or hear other remote participants 122.

FIG. 3 illustrates a flow chart of an example method 300 for determining whether a participant 122 is speaking, in accordance with embodiments of the present disclosure. In some embodiments, method 300 may be performed or executed in whole or part by a mute assist engine (e.g., mute assist engine 132). Method 300 describes steps that may be performed in a processing cycle of mute assist engine 132 (e.g., analysis of a single frame of audio sample data and its corresponding video image data). According to some embodiments, method 300 may begin at step 302. As noted above, teachings of the present disclosure may be implemented in a variety of configurations of system 100. As such, the preferred initialization point for method 300 and the order of the steps comprising method 300 may depend on the implementation chosen.

At step 302, mute assist engine 132 may receive an audio sample data frame from microphone 118 and analyze the audio sample data frame to determine a volume of audio captured from microphone 118 during the frame. At step 304, mute assist engine 132 may determine whether the volume exceeds a predetermined intensity threshold. A volume exceeding the predetermined intensity threshold may, alone or together with other analyses performed by mute assist engine 132, indicate that the participant 122 is attempting to speak to other conference participants 122. Such predetermined intensity threshold may be configurable (e.g., by a participant 122 of mute assist engine 132, set automatically, or set in any other suitable manner). Such configurability may allow performance enhancement such as auto-adaptation of the threshold to specific users, specific microphones, and/or tuning by a participant to his or her preference. If the volume exceeds the predetermined intensity threshold, method 300 may proceed to step 306, where further processing may take place to determine if participant 122 is attempting to speak to other conference participants 122. Otherwise, method 300 may proceed to step 330.

At step 306, mute assist engine 132 may analyze the audio sample data frame to determine if the audio sample data frame includes human speech. Any suitable analysis may be applied to determine if human speech is present, including speech detection algorithms, background noise cancellation algorithms, comparison to historical audio information, and/or other techniques. At step 308, mute assist engine 132 may make a determination whether the audio sample data frame includes human speech. If the audio sample data frame includes human speech, method 300 may proceed to step 312, where further processing may take place to determine if participant 122 is attempting to speak to other conference participants 122. Otherwise, method 300 may proceed to step 330.

At step 312, mute assist engine 132 may analyze a video image data frame associated with the audio sample data frame to determine if the video image data frame includes the presence of a primary face, thus indicating the presence or absence of a participant 122 in the video image captured by camera 120. For example, a face in the video image may be considered a primary face if it meets predetermined requirements for the proportion of the video image which it occupies. At step 314, mute assist engine 132 may make a determination whether a primary face is present in the video image. If a primary face is present, method 300 may proceed to step 316, where further processing may take place to determine if participant 122 is attempting to speak to other conference participants 122. Otherwise, method 300 may proceed to step 330.

At step 316, mute assist engine 132 may analyze the video image data frame to determine if an orientation of the primary face indicates that participant 122 is facing camera 120 and/or display 116, within predetermined angular tolerances. Such predetermined angular tolerances may be configurable (e.g., by a participant 122 of mute assist engine 132, set automatically, or set in any other suitable manner). At step 318, if participant 122 is determined to be facing camera 116 and/or display 120, method 300 may proceed to step 320, where further processing may take place to determine if participant 122 is attempting to speak to other conference participants 122. Otherwise, method 300 may proceed to step 330.

At step 320, mute assist engine 132 may analyze the video image data frame to determine if a participant 122's lips are moving in a manner indicating speech, thus indicating that the participant 122 is speaking. Any suitable analysis may be applied to determine if speech is present. For example, in some embodiments, mute assist engine 132 may analyze participant 122's lips across multiple images to determine if the lips are moving in a manner consistent with the act of speaking, which may require comparison of a current image with historical video image data (e.g., one or more previous video image data frames captured by camera 120 or extracted data regarding lip movement from previous video image frames). At step 322, if participant 122's lips are determined to be moving in a manner consistent with speaking, method 300 may proceed to step 324. Otherwise, method 300 may proceed to step 330.

In some embodiments, image tracking may be used to limit the amount of image data to be processed during execution of method 300. For example, in such embodiments, mute assist engine 132 may track only the head or lips of participant 122. In such embodiments, certain steps of method 300 may be skipped or bypassed, thus reducing processing requirements. As a specific example, steps 312-318 may execute a first time and detect a primary face within the predetermined angular tolerance, after which image tracking may be used in steps 320 and 322 to detect lip movement. In subsequent executions of method 300, steps 312-318 may be bypassed, and only lip movement may be analyzed, until such time as mute assist engine 132 experiences a condition (e.g., lip region of video image data is no longer recognizable by mute assist engine 132), after which steps 312-318 may again execute.

At step 324, responsive to the performance of steps 302 through 322 providing an indication that participant 122 is speaking, mute assist engine 132 may determine if a variable Participant_State, which is indicative of whether participant 122 is speaking, is set to indicate that participant 122 is speaking. Notably, when mute assist engine 132 initializes and before first execution of method 300, Participant_State may be set to value indicating that participant 122 is not speaking. If the variable indicates that participant 122 is speaking, method 300 may proceed to step 326. Otherwise, if the variable indicates that participant 122 is not speaking, method 300 may proceed to step 328.

At step 326, mute assist engine 132 may increment a hysteresis counter, provided such hysteresis counter has not reached a predetermined maximum value (in which case, the hysteresis counter remains at its maximum value in step 326). The hysteresis counter may provide hysteresis to mute assist engine 132, in order to ensure that once mute assist engine 132 has determined that participant 122 is speaking to other participants 122, momentary pauses in speech or lip movement or changes in head orientation do not cause mute assist engine 132 to prematurely signal that speaking has stopped. For example, once participant 122 begins to speak to participants, he or she may temporarily turn away from the screen while talking. Hysteresis may allow for these types of movements without signaling that speaking has stopped. At the conclusion of step 326, method 300 may end.

At step 328, the variable Participant_State may be set to a value indicating that participant 122 is speaking and reset the hysteresis counter to its predetermined maximum setting (which, may be configurable by participant 122, set automatically, or set in any other way). After completion of step 328, method 300 may end.

At step 330, responsive to the performance of any of steps 302 through 322 providing an indication that participant 122 is not speaking, mute assist engine 132 may determine if the variable Participant_State is set to indicate that participant 122 is speaking. If the variable indicates that participant 122 is speaking, method 300 may proceed to step 332. Otherwise, if the variable indicates that participant 122 is not speaking, method 300 may end, in which case the variable Participant_State may remain set to indicate participant 122 is not speaking.

At step 332, mute assist engine 132 may decrement the hysteresis counter. At step 334, mute assist engine 132 may determine if the hysteresis counter has reached a predetermined minimumvalue (e.g., zero). If the hysteresis counter has reached zero, method 300 may proceed to step 336. Otherwise, if the hysteresis counter has not reached the predetermined minimum value, method 300 may end, in which case the variable Participant_State may remain set to indicate participant 122 is speaking.

At step 336, responsive to the hysteresis counter reaching zero, mute assist engine 132 may set the variable Participant_State to indicate participant 122 is not speaking. After completion of step 336, method 300 may end.

To further explain the hysteresis employed by method 300, in accordance with the description above, the hysteresis counter variable is reset to its maximum whenever mute assist engine 132 is initialized and anytime the Participant_State variable changes from an indication that participant 122 is not speaking to an indication that participant 122 is speaking. During any duration in which the Participant_State variable indicates participant 122 is speaking, mute assist engine 122 may analyze each new image and audio frame, and if mute assist engine 132 does not detect that participant 122 is speaking to other teleconference participants 122, the hysteresis counter is decremented. On the other hand, if mute assist engine 132 detects that speaking continues, it may increment the hysteresis counter (up to the predetermined maximum). If and when the hysteresis counter reaches its minimum value (e.g., zero), mute assist engine 132 may change the Participant_State variable to indicate that participant 122 is not speaking.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information system 100, an information handling system 102, components thereof, and/or any other system operable to implement method 300. In certain embodiments, method 300 may be implemented partially or fully in software and/or firmware embodied in computer-readable media.

Although steps 302 through 322 may be completed in any order, in some embodiments, mute assist engine 132 may execute steps 302 through 322 in an order such that the amount of power and resources (processor, memory, etc.)

consumed during audio and video analysis is reduced. For example, mute assist engine 132 may execute steps having lower power and resource costs before those with higher cost, and proceed through the analyses until a test fails or all tests pass. The order of steps in FIG. 3 may be one example ordering in which analyses proceed in order of increasing power and/or processing cost.

In addition, in some embodiments, some of steps 302 through 322 in which audio frame analysis is undertaken may not execute in the event that participant 312 has muted microphone 118. For example, if a participant 112 has muted microphone 118, method 300 may skip steps 302 through 308, and begin execution at step 312.

Also, some of steps of method 300 may not execute if components necessary to execute such steps are not present. For example, if a camera 120 is not present, steps 312 through 322 may not execute and the "yes" branch from step 308 may flow directly to step 328.

Method 300 described above may be used to manage a mute state of microphone 118 in one or more scenarios, including without limitation: (i) providing an alert to display 116 and/or speaker 124 if method 300 determines that participant 122 is speaking while microphone 118 is muted; and/or (ii) if microphone 118 is not muted, modifying audio sample data to prevent transmission of audio if method 300 determines that participant 122 is not speaking.

In the second scenario above, mute assist engine 132 may implement an audio frame buffer holding up to N of the most recent audio sample data frames. During each processing cycle during which Participant_State indicates participant 122 is not speaking, mute assist engine 132 may buffer the incoming audio sample data frame and output a quiet audio frame to encoding and transmission block 204, wherein such quiet audio frame will playback as substantial silence to other participants 122. After mute assist engine 132 detects that participant 122 is speaking to other participants 122, during each cycle beginning with the first cycle after detection of speech and until the buffer is emptied, mute assist engine 132 may buffer the incoming audio frame and extract more than an audio sample data frame's worth of samples from the trailing end of the audio frame buffer. Such samples may be compressed to fit in a new audio sample data frame, which is then output along with the received video image data frame for such cycle. Accordingly, due to such compression, over multiple cycles, the audio frame buffer is emptied faster than new audio is received, until no samples remain in the audio frame buffer.

Although the foregoing discussion contemplates analysis of both video and audio data to manage a mute state of a microphone in a teleconference, in some embodiments (e.g., with information handling systems 102 not including a camera 120 for capturing video images) a mute assist engine 132 may analyze only audio samples. In such embodiments, method 300 may not include steps 312 through 322, and execution of method 300 may flow from step 308 to either of steps 324 or 330 based on the determination made at step 308.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. A method for managing a mute state of a participant in a teleconference, comprising:

detecting based on analysis of at least one characteristic of audio data received from a microphone associated with the participant or image data received from a camera associated with the participant, whether the participant is attempting to speak to other teleconference participants, wherein detecting whether the participant is attempting to speak to other teleconference participants comprises:

in each of multiple processing cycles, analyzing a frame of at least one of the image data and the audio data to indicate whether in each cycle, that the participant is attempting to speak to other teleconference participants; and applying a hysteresis to the analysis of the frames, such that detecting that the participant is not attempting to speak occurs upon determining that within a particular trailing number of processing cycles, the number of cycles in which analysis indicates that the participant is not attempting to speak to teleconference participants exceeds the number of cycles in which analysis indicates that the participant is attempting to speak to teleconference participants by at least a predetermined threshold; and providing an alert to the participant in response to a detecting that the participant is attempting to speak to other teleconference participants while the microphone is muted.

2. The method of claim 1, wherein the alert comprises at least one of an audio alert communicated to a speaker associated with the participant and one of a visual alert communicated to a display associated with the participant.

3. The method of claim 1, wherein the at least one characteristic comprises:
a volume of the audio data;
a presence or absence of human speech in the audio data;
a presence or absence of a primary face in the image data;
an orientation of the primary face in the image data; and
lip movement of the primary face indicative of speech in the image data.

4. The method of claim 1, wherein detecting whether the participant is attempting to speak to other teleconference participants further comprises detecting that the participant is attempting to speak occurs upon determining that within a particular trailing number of processing cycles, the number of cycles in which analysis indicates that the participant is not attempting to speak to teleconference participants does not exceed the number of cycles in which analysis indicates that the participant is attempting to speak to teleconference participants by at least a predetermined threshold.

5. An article of manufacture comprising:
a non-transitory computer readable medium; and
computer-executable instructions carried on the non-transitory computer readable medium, the instructions readable by a processor, the instructions, when read and executed, for causing the processor to:
detect, based on analysis of at least one characteristic of audio data received from a microphone associated with a participant or image data received from a camera associated with the participant, whether the participant is attempting to speak to other teleconference participants, wherein detecting whether the participant is attempting to speak to other teleconference participants comprises:
in each of multiple processing cycles, analyzing a frame of at least one of the image data and the audio data to indicate whether in each cycle, that the participant is attempting to speak to other teleconference participants; and
applying a hysteresis to the analysis of the frames, such that detecting that the participant is not attempting to speak occurs upon determining that within a particular trailing number of processing cycles, the number of cycles in which analysis indicates that the participant is not attempting to speak to teleconference participants exceeds the number of cycles in which analysis indicates that the participant is attempting to speak to teleconference participants by at least a predetermined threshold; and
provide an alert to the participant in response to a detecting that the participant is attempting to speak to other tele conference participants while the microphone is muted.

6. The article of claim 5, wherein the alert comprises at least one of an audio alert communicated to a speaker associated with the participant and one of a visual alert communicated to a display associated with the participant.

7. The article of claim 5, wherein the at least one characteristic comprises:
a volume of the audio data;
a presence or absence of human speech in the audio data;
a presence or absence of a primary face in the image data;
an orientation of the primary face in the image data; and
lip movement of the primary face indicative of speech in the image data.

8. The article of claim 5, wherein detecting whether the participant is attempting to speak to other teleconference participants further comprises detecting that the participant is attempting to speak occurs upon determining that within a particular trailing number of processing cycles, the number of cycles in which analysis indicates that the participant is not attempting to speak to teleconference participants does not exceed the number of cycles in which analysis indicates that the participant is attempting to speak to teleconference participants by at least a predetermined threshold.

9. An information handling system comprising:
a microphone input for receiving audio data from a microphone associated with a participant in a teleconference;
a camera input for receiving image data associated with the participant; and
a processor communicatively coupled to the microphone input and the camera input and configured to:
detect, based on analysis of at least one characteristic of the audio data or the image data, whether the participant is attempting to speak to other teleconference participants, wherein detecting whether the participant is attempting to speak to other teleconference participants comprises:
in each of multiple processing cycles, analyzing a frame of at least one of the image data and the audio data to indicate whether in each cycle, that the participant is attempting to speak to other teleconference participants; and
applying a hysteresis to the analysis of the frames, such that detecting that the participant is not attempting to speak occurs upon determining that within a particular trailing number of processing cycles, the number of cycles in which analysis indicates that the participant is not attempting to speak to teleconference participants exceeds the number of cycles in which analysis indicates that the participant is attempting to speak to teleconference participants by at least a predetermined threshold; and
provide an alert to the participant in response to a detecting that the participant is attempting to speak to other teleconference participants while the microphone is muted.

10. The information handling system of claim 9, wherein the alert comprises at least one of an audio alert communicated to a speaker associated with the participant and one of a visual alert communicated to a display associated with the participant.

11. The information handling system of claim 9, wherein the at least one characteristic comprises:
a volume of the audio data;
a presence or absence of human speech in the audio data;
a presence or absence of a primary face in the image data;
an orientation of the primary face in the image data; and
lip movement of the primary face indicative of speech in the image data.

12. The information handling system of claim 9, wherein detecting whether the participant is attempting to speak to other teleconference participants further comprises detecting that the participant is attempting to speak occurs upon determining that within a particular trailing number of processing cycles, the number of cycles in which analysis indicates that the participant is not attempting to speak to teleconference participants does not exceed the number of cycles in which analysis indicates that the participant is attempting to speak to teleconference participants by at least a predetermined threshold.

* * * * *